(12) United States Patent
Fang et al.

(10) Patent No.: US 10,496,781 B2
(45) Date of Patent: Dec. 3, 2019

(54) METROLOGY RECIPE GENERATION USING PREDICTED METROLOGY IMAGES

(71) Applicant: KLA-Tencor Corporation, Milpitas, CA (US)

(72) Inventors: Chao Fang, Milpitas, CA (US); Mark D. Smith, San Jose, CA (US); Brian Duffy, San Jose, CA (US)

(73) Assignee: KLA Tencor Corporation, Milpitas, CA (US)

( * ) Notice: Subject to any disclaimer, the term of this patent is extended or adjusted under 35 U.S.C. 154(b) by 183 days.

(21) Appl. No.: 15/810,898

(22) Filed: Nov. 13, 2017

(65) Prior Publication Data
US 2018/0173839 A1    Jun. 21, 2018

Related U.S. Application Data

(60) Provisional application No. 62/435,977, filed on Dec. 19, 2016.

(51) Int. Cl.
| | |
|---|---|
| *G06F 17/50* | (2006.01) |
| *G01B 21/02* | (2006.01) |
| *G06T 7/00* | (2017.01) |
| *G03F 7/20* | (2006.01) |

(52) U.S. Cl.
CPC ......... *G06F 17/5081* (2013.01); *G01B 21/02* (2013.01); *G03F 7/705* (2013.01); *G03F 7/70616* (2013.01); *G06T 7/001* (2013.01); *G06T 7/0004* (2013.01); *G06F 2217/82* (2013.01); *G06T 2200/04* (2013.01); *G06T 2200/08* (2013.01);

(Continued)

(58) Field of Classification Search
USPC .................... 716/51, 52, 53, 54, 55
See application file for complete search history.

(56) References Cited

U.S. PATENT DOCUMENTS

| | | | |
|---|---|---|---|
| 7,873,504 B1 * | 1/2011 | Bevis | ....................... G03F 1/36 |
| | | | 356/252 |
| 9,151,712 B1 | 10/2015 | Adel et al. | |
| 9,243,886 B1 * | 1/2016 | Kuznetsov | ......... G01N 21/4788 |

(Continued)

OTHER PUBLICATIONS

International Search Report dated Mar. 30, 2018 for PCT/US2017/066517.

*Primary Examiner* — Brian Ngo
(74) *Attorney, Agent, or Firm* — Suiter Swants pc llo

(57) ABSTRACT

A metrology system includes a controller communicatively coupled to a metrology tool. The controller may generate a three-dimensional model of a sample, generate a predicted metrology image corresponding to a predicted analysis of the sample with the metrology tool based on the three-dimensional model, evaluate two or more candidate metrology recipes for extracting the metrology measurement from the one or more predicted metrology images, select, based on one or more selection metrics, a metrology recipe from the two or more candidate metrology recipes for extracting a metrology measurement from an image of the structure from the metrology tool, receive an output metrology image of a fabricated structure from the metrology tool based on a metrology measurement of the fabricated structure, and extract the metrology measurement associated with the fabricated structure from the output metrology image based on the metrology recipe.

42 Claims, 11 Drawing Sheets

(52) U.S. Cl.
CPC ............... *G06T 2207/20076* (2013.01); *G06T 2207/20081* (2013.01); *G06T 2207/30148* (2013.01)

(56) References Cited

U.S. PATENT DOCUMENTS

| | | | |
|---|---|---|---|
| 9,470,639 B1* | 10/2016 | Zhuang | G01N 21/9501 |
| 10,345,721 B1* | 7/2019 | Cao | G03F 9/70 |
| 2003/0229410 A1* | 12/2003 | Smith | G06F 17/5068 |
| | | | 700/109 |
| 2008/0250384 A1 | 10/2008 | Duffy et al. | |
| 2015/0006103 A1 | 1/2015 | De Wel et al. | |
| 2016/0025650 A1 | 1/2016 | Lee et al. | |
| 2016/0290796 A1* | 10/2016 | Levy | G01N 21/9501 |
| 2016/0299438 A1* | 10/2016 | Mos | G06F 3/0482 |
| 2017/0023491 A1* | 1/2017 | Cao | G01N 21/211 |
| 2018/0067900 A1* | 3/2018 | Mos | G03F 7/70508 |
| 2018/0299770 A1* | 10/2018 | Ten Berge | G03F 1/72 |
| 2018/0322237 A1* | 11/2018 | Ten Berge | G03F 1/70 |

* cited by examiner

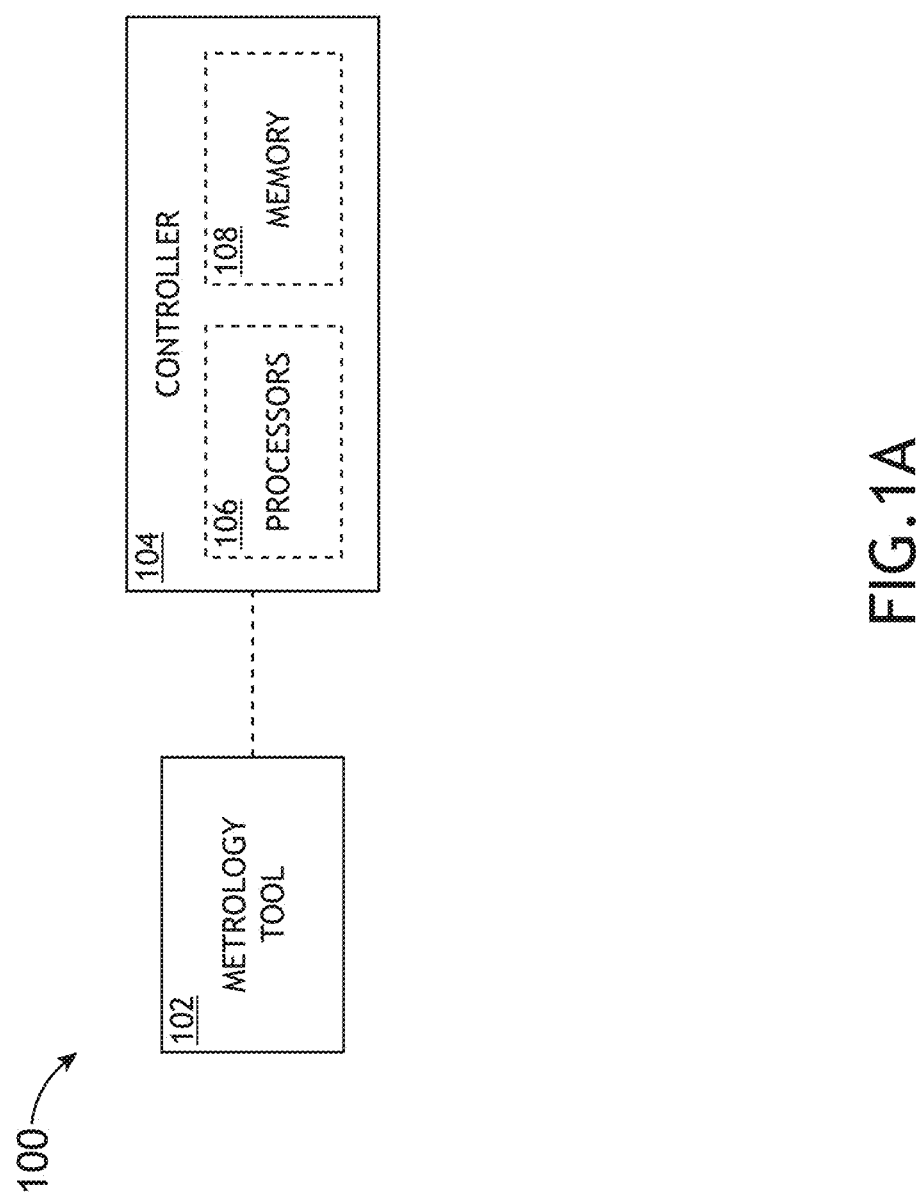

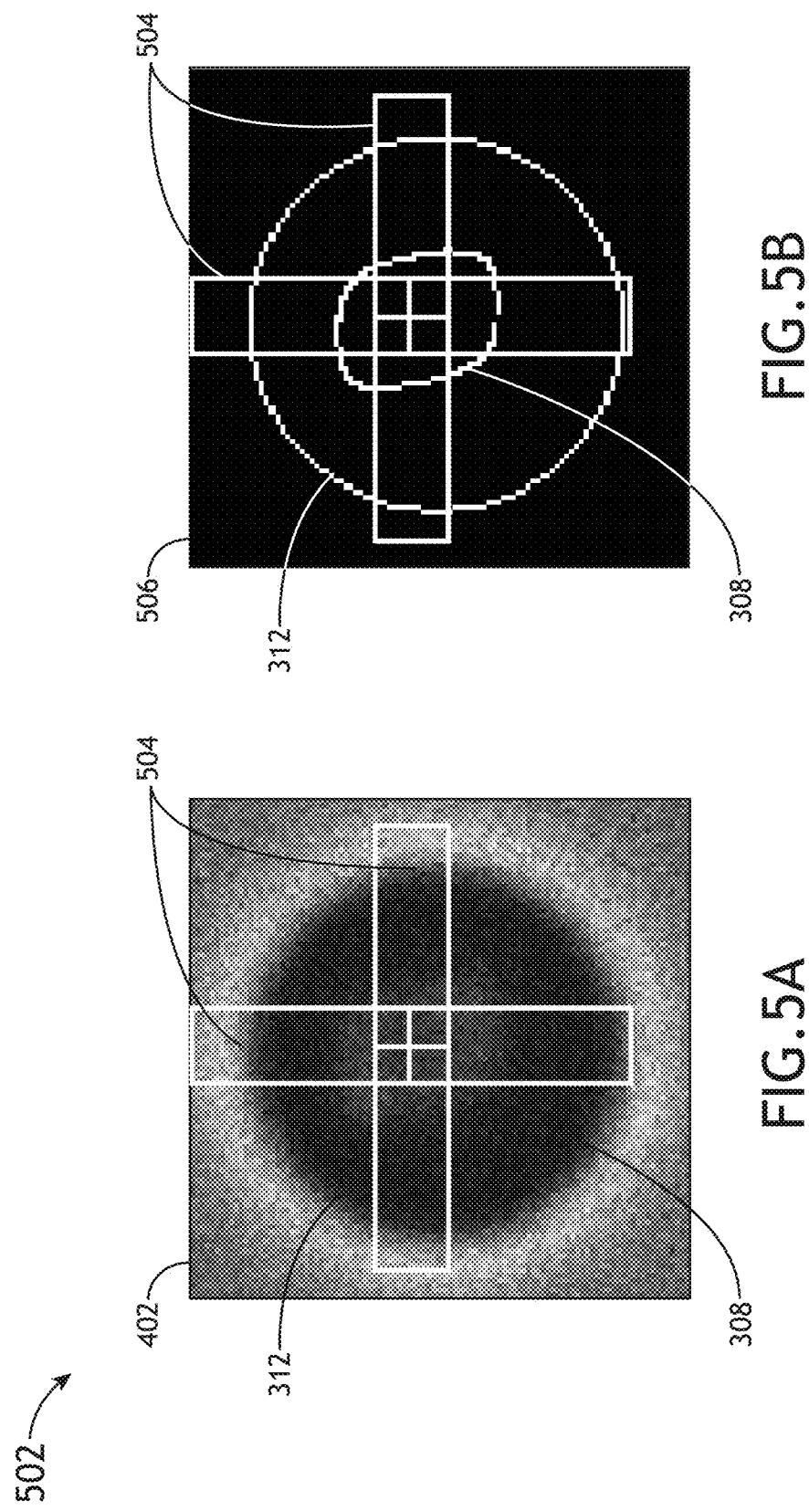

METROLOGY RECIPE GENERATION USING PREDICTED METROLOGY IMAGES

CROSS-REFERENCE TO RELATED APPLICATION

The present application claims the benefit under 35 U.S.C. § 119(e) of U.S. Provisional Application Ser. No. 62/435,977 filed Dec. 19, 2016, entitled SETTING UP METROLOGY AND INSPECTION RECIPES FROM SIMULATED/GENERATED IMAGES, naming Chao Fang, Mark D. Smith, and Brian Duffy as inventors, which is incorporated herein by reference in the entirety.

TECHNICAL FIELD

The present application is directed generally to metrology, and more particularly, to the generation of metrology recipes.

BACKGROUND

Metrology systems typically utilize metrology recipes to perform metrology of a sample. For example, a metrology recipe of an image-based metrology system may include, but is not limited to, generating an image of a sample with selected parameters using a metrology tool and performing one or more image analysis steps on the resulting image to extract a desired metrology measurement. Critical performance metrics of a metrology system such as measurement accuracy, sensitivity to sample and/or environmental deviations, or the like may critically depend on the metrology recipe used to generate measurements. However, selection of metrology recipes for highly sensitive applications such as semiconductor manufacturing is typically a time-consuming and costly procedure requiring multiple experiments using expensive equipment. Therefore, it would be desirable to provide a system and method for curing deficiencies such as those identified above.

SUMMARY

A metrology system is disclosed in accordance with one or more illustrative embodiments of the present disclosure. In one illustrative embodiment, the system includes a controller communicatively coupled to a metrology tool. In another illustrative embodiment, the controller generates a three-dimensional model of a sample including one or more instances of a structure to be analyzed by the metrology tool. In another illustrative embodiment, the controller generates a predicted metrology image corresponding to a predicted analysis of the sample with the metrology tool based on the three-dimensional model. In another illustrative embodiment, the controller evaluates two or more candidate metrology recipes for extracting the metrology measurement from the one or more predicted metrology images. In another illustrative embodiment, the controller selects, based on one or more selection metrics, a metrology recipe from the two or more candidate metrology recipes for extracting a metrology measurement from an image of the structure from the metrology tool. In another illustrative embodiment, the controller receives an output metrology image of a fabricated structure from the metrology tool based on a metrology measurement of the fabricated structure. In another illustrative embodiment, the controller extracts the metrology measurement associated with the fabricated structure from the output metrology image based on the metrology recipe.

A metrology system is disclosed in accordance with one or more illustrative embodiments of the present disclosure. In one illustrative embodiment, the system includes a metrology tool. In another illustrative embodiment, the system includes a controller communicatively coupled to the metrology tool. In another illustrative embodiment, the controller generates a three-dimensional model of a sample including one or more instances of a structure to be analyzed by the metrology tool. In another illustrative embodiment, the controller generates a predicted metrology image corresponding to a predicted analysis of the sample with the metrology tool based on the three-dimensional model. In another illustrative embodiment, the controller evaluates two or more candidate metrology recipes for extracting the metrology measurement from the one or more predicted metrology images. In another illustrative embodiment, the controller selects, based on one or more selection metrics, a metrology recipe from the two or more candidate metrology recipes for extracting a metrology measurement from an image of the structure from the metrology tool. In another illustrative embodiment, the controller receives an output metrology image of a fabricated structure from the metrology tool based on a metrology measurement of the fabricated structure. In another illustrative embodiment, the controller extracts the metrology measurement associated with the fabricated structure from the output metrology image based on the metrology recipe.

A metrology method is disclosed in accordance with one or more illustrative embodiments of the present disclosure. In one illustrative embodiment, the method includes generating a three-dimensional model of a sample including one or more instances of a structure to be analyzed by a metrology tool. In another illustrative embodiment, the method includes generating a predicted metrology image corresponding to a predicted analysis of the sample with the metrology tool based on the three-dimensional model. In another illustrative embodiment, the method includes evaluating two or more candidate metrology recipes for extracting the metrology measurement from the one or more predicted metrology images. In another illustrative embodiment, the method includes selecting, based on one or more selection metrics, a metrology recipe from the two or more candidate metrology recipes for extracting a metrology measurement from an image of the structure from the metrology tool. In another illustrative embodiment, the method includes performing a metrology measurement of a fabricated structure to generate an output metrology image. In another illustrative embodiment, the method includes extracting the metrology measurement associated with the fabricated structure from the output metrology image based on the metrology recipe.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention, and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 1A is a conceptual view illustrating a semiconductor device metrology system, in accordance with one or more embodiments of the present disclosure.

FIG. 5A is an image of a portion of the predicted metrology image including a single instance of the overlay structure, in accordance with one or more embodiments of the present disclosure.

FIG. 5B includes a modified version of FIG. 5A in which the edges of a rectangular pattern element and an open circular pattern have been identified, in accordance with one or more embodiments of the present disclosure.

DETAILED DESCRIPTION

Figure 1B:
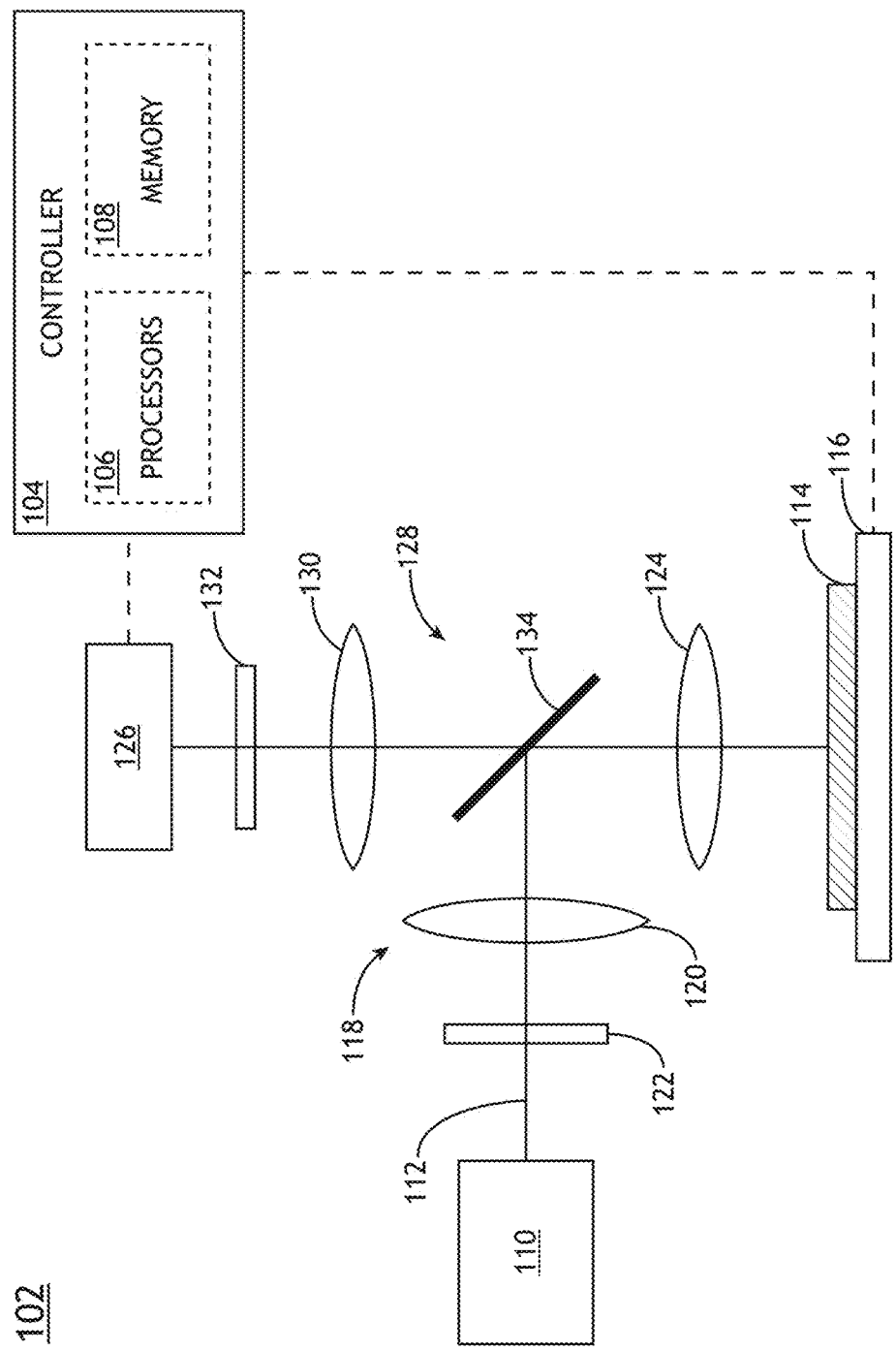
FIG. 1B is a conceptual view illustrating an optical metrology tool, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to formulating a metrology recipe to perform a metrology measurement of a selected structure by generating a three-dimensional model of a sample including a structure to be analyzed, generating a predicted metrology image by predicting a metrology image of the sample, and creating a metrology recipe based on the predicted metrology image. In this regard, a metrology recipe may be created without the time and expense of fabricating and analyzing test samples.

Embodiments of the present disclosure are directed to creating metrology recipes for extracting metrology measurements from image-based metrology systems. Image-based metrology systems, referred to in the present disclosure simply as metrology systems, typically provide an image of a sample (e.g., a metrology image) and subsequently utilize a metrology recipe including one or more image analysis steps to extract one or more metrology measurements from the metrology image. Further, image-based metrology systems may generally provide a wide range of metrology measurements. For example, a metrology measurement may include an overlay measurement indicative of relative alignment between two or more layers on a sample. By way of another example, a metrology measurement may include measurements of the size, shape, sidewall angle, and/or orientation of patterns fabricated on the sample. For instance, metrology measurements may include, but are not limited to, critical dimension (CD) measurements, sidewall angle measurements, line roughness measurements, or linewidth measurements. By way of a further example, metrology measurements may include detecting defects (e.g., defect inspection) on a patterned or an unpatterned sample. For the purposes of the present disclosure, the terms metrology system and inspection system should be interpreted as interchangeable.

Additional embodiments of the present disclosure are directed to generating a predicted metrology image of a sample including one or more instances of a selected structure. The predicted metrology image may correspond to a predicted output image of the sample using a selected metrology tool operated with selected measurement parameters. The predicted metrology image may be generated in any manner known in the art such as, but not limited to, simulating an image of the sample using heuristic model, rigorous numerical simulations based on the emulating the operation of the selected metrology tool (e.g., emulation), or deep generative modeling (DGM) to predict an output image based on a set of training images.

Additional embodiments of the present disclosure are directed to generating a three-dimensional model of the sample to serve as an input to generate the predicted metrology image. As used throughout the present disclosure, the term "sample" may refer to any object suitable for measurement in a metrology system. For example, a sample may include, but is not limited to, an unpatterned substrate formed of a semiconductor or non-semiconductor material (e.g., a wafer, or the like). A semiconductor or non-semiconductor material may include, but is not limited to, monocrystalline silicon, gallium arsenide, and indium phosphide. By way of another example, a sample may include a patterned wafer. A sample may thus include one or more layers. For example, such layers may include, but are not limited to, a resist, a dielectric material, a conductive material, and a semiconductive material. Many different types of such layers are known in the art, and the term sample as used herein is intended to encompass a sample on which all types of such layers may be formed. By way of another example, a sample may include a reticle. Further, for the purposes of the present disclosure, the terms sample, wafer, and reticle should be interpreted as interchangeable.

A semiconductor device may typically be formed as multiple layers of printed elements. Printed features on a sample associated with a process layer may be fabricated through a series of additive or subtractive process steps such as, but not limited to, one or more material deposition steps, one or more lithography steps, one or more etching steps, or one or more lift-off steps. The three-dimensional model of the sample may thus include a representation of one or more patterns formed out of one or more layers of printed elements. Further, the three-dimensional model may include any combination of chemical, mechanical, electrical, or optical properties of the one or more patterned layers. In this regard, the predicted metrology image may be based on known properties of the sample. Further embodiments of the present disclosure are directed to generating the three-dimensional model by predicting (e.g., via simulation, emulation, DGM, or the like) one or more process steps associated with the fabrication of the sample with selected process tools using selected process conditions. In this regard, the three-dimensional model may be an accurate representation of an as-fabricated structure.

Additional embodiments of the present disclosure are directed to generating a predicted metrology image that incorporates at least one source of noise. It is recognized herein that a metrology measurement of a fabricated sample with a selected metrology tool may suffer from various sources of noise that may degrade an output metrology image. For example, noise sources may be associated with controllable phenomena such as, but not limited to, vibrations, fluctuations of an imaging beam, charging of material in response to an incident electron or ion beam, or aberrations in an imaging system. By way of another example, noise sources may include stochastic (e.g., random) noise such as, but not limited to, photon shot noise associated with absorption of photons by the sample, detector shot noise, or the like. It is further recognized herein that different metrology recipes may have varying sensitivity to different types of noise. Further embodiments of the present disclosure are directed to selecting one or more aspects of a metrology recipe to be resilient to types of noise expected to be present for analysis of fabricated samples in a selected metrology tool.

In this regard, the metrology recipes generated based on the predicted metrology image may provide highly accurate metrology measurements (e.g., within a desired performance specification) when applied to fabricated samples. Accordingly, generating metrology recipes based on a predicted metrology image may provide efficient metrology recipe determination, which may translate to flexible metrology solutions for all phases of semiconductor production. Further, systems and methods described herein may facilitate the creation of complex and/or finely tuned metrology recipes based on the flexibility and scalability of predicted metrology images.

FIG. 1A is a conceptual view illustrating a semiconductor device metrology system 100, in accordance with one or more embodiments of the present disclosure. In one embodiment, the metrology system 100 includes a metrology tool 102. For example, the metrology tool 102 may generate an image of one or more portions of a sample. In another embodiment, the metrology system 100 includes a controller 104. In another embodiment, the controller 104 includes one or more processors 106 configured to execute program instructions maintained on a memory device 108. In this regard, the one or more processors 106 of controller 104 may execute any of the various process steps described throughout the present disclosure. For example, the controller 104 may extract any metrology measurement (e.g., overlay measurement, dimensions of sample features, critical dimensions (CD), sidewall angles, detected defects, or the like) from a metrology image (e.g., a predicted metrology image or a metrology image from the metrology tool 102) using any method known in the art.

The one or more processors 106 of the controller 104 may include any processing element known in the art. In this sense, the one or more processors 106 may include any microprocessor-type device configured to execute algorithms and/or instructions. In one embodiment, the one or more processors 106 may consist of a desktop computer, mainframe computer system, workstation, image computer, parallel processor, or any other computer system (e.g., networked computer) configured to execute a program configured to operate the metrology system 100, as described throughout the present disclosure. It is further recognized that the term "processor" may be broadly defined to encompass any device having one or more processing elements, which execute program instructions from a non-transitory memory device 108. Further, the steps described throughout the present disclosure may be carried out by a single controller 104 or, alternatively, multiple controllers. Additionally, the controller 104 may include one or more controllers housed in a common housing or within multiple housings. In this way, any controller or combination of controllers may be separately packaged as a module suitable for integration into metrology system 100. Further, the controller 104 may analyze data received from a detector 126 and feed the data to additional components within the metrology tool 102 or external to the metrology system 100.

The memory device 108 may include any storage medium known in the art suitable for storing program instructions executable by the associated one or more processors 106. For example, the memory device 108 may include a non-transitory memory medium. By way of another example, the memory device 108 may include, but is not limited to, a read-only memory, a random access memory, a magnetic or optical memory device (e.g., disk), a magnetic tape, a solid state drive, and the like. It is further noted that memory device 108 may be housed in a common controller housing with the one or more processors 106. In one embodiment, the memory device 108 may be located remotely with respect to the physical location of the one or more processors 106 and controller 104. For instance, the one or more processors 106 of controller 104 may access a remote memory (e.g., server), accessible through a network (e.g., internet, intranet and the like). Therefore, the above description should not be interpreted as a limitation on the present invention but merely an illustration.

Figure 1C:
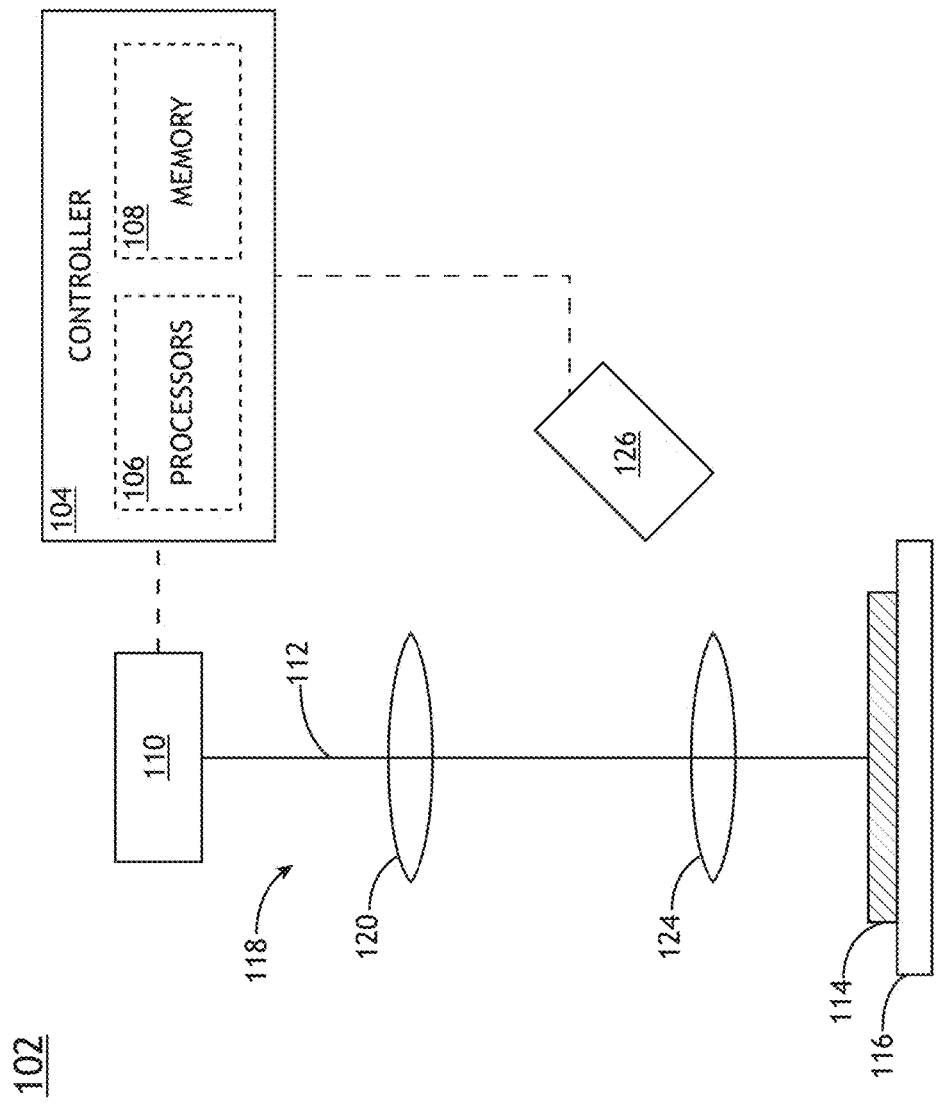
FIG. 1C is a conceptual view of a metrology tool configured as a particle beam metrology tool, in accordance with one or more embodiments of the present disclosure.

Referring now to FIGS. 1B and 1C, various components of the metrology system 100 are described in greater detail.

The metrology tool 102 may include any type of metrology device known in the art. For example, the metrology tool 102 may illuminate a sample with an illumination beam and may further collect radiation emanating from the sample in response to the illumination beam. The illumination beam may include any type of illumination beam suitable for probing a sample such as, but not limited to, a light beam (e.g., photons), an electron beam, or an ion beam. Further, the radiation emanating from the sample may include photons, electrons, ions, neutral particles, or the like. Accordingly, the metrology tool 102 may include an optical metrology tool, an e-beam metrology tool, a scanning electron microscope (SEM), an ion-beam metrology tool, or the like.

The metrology tool 102 may further operate in either a direct imaging mode or a scanning imaging mode. For example, the metrology tool 102 operating in a direct imaging mode may illuminate a portion of the sample larger than the system resolution and capture an image of the illuminated portion of the sample on a detector. The captured image may be any type of image known in the art such as, but not limited to, a brightfield image, a darkfield image, a phase-contrast image, or the like. Further, captured images may be stitched together (e.g., by the metrology tool 102, by the controller 104, or the like) to form a composite image of the sample. By way of another example, the metrology tool 102 operating in a scanning mode may scan a focused beam across the sample and capture radiation and/or particles emanating from the sample on one or more detectors at one or more measurement angles. The focused beam may be scanned across the sample by modifying the beam path (e.g., using a galvo mirror, a piezo-electric mirror, or the like) and/or by translating the sample through a focal volume of the focused beam. The captured radiation may then be stitched together (e.g., by the metrology tool 102, by the controller 104, or the like) to form a composite image of the sample.

FIG. 1B is a conceptual view illustrating an optical metrology tool 102, in accordance with one or more embodiments of the present disclosure. In one embodiment, the metrology tool 102 includes an illumination source 110 configured to generate an illumination beam 112. The illumination beam 112 may include one or more selected wavelengths of light including, but not limited to, ultraviolet (UV) radiation, visible radiation, or infrared (IR) radiation.

The illumination source 110 may be any type of illumination source known in the art suitable for generating an optical illumination beam 112. In one embodiment, the illumination source 110 includes a broadband plasma (BBP) illumination source. In this regard, the illumination beam 112 may include radiation emitted by a plasma. For example, a BBP illumination source 110 may include, but is not required to include, one or more pump sources (e.g., one or more lasers) configured to focus pump light into a volume of a gas, causing energy to be absorbed by the gas in order to generate or sustain a plasma suitable for emitting radiation. Further, at least a portion of the plasma radiation may be utilized as the illumination beam 112. In another embodiment, the illumination source 110 may include one or more lasers. For instance, the illumination source 110 may include any laser system known in the art capable of emitting radiation in the infrared, visible, or ultraviolet portions of the electromagnetic spectrum.

In another embodiment, the illumination source 110 directs the illumination beam 112 to a sample 114 disposed on a sample stage 116 via an illumination pathway 118. The illumination pathway 118 may include one or more lenses 120 or additional optical components 122 suitable for modifying and/or conditioning the illumination beam 112. For example, the one or more optical components 122 may include, but are not limited to, one or more polarizers, one or more filters, one or more beam splitters, one or more diffusers, one or more homogenizers, one or more apodizers, or one or more beam shapers. In another embodiment, the metrology tool 102 includes an objective lens 124 to focus the illumination beam 112 onto the sample 114.

In another embodiment, the metrology tool 102 includes a detector 126 configured to capture radiation emanating from the sample 114 through a collection pathway 128. For example, a detector 126 may receive an image of the sample 114 provided by elements in the collection pathway 128 (e.g., the objective lens 124, one or more collection lenses 130, or the like). The collection pathway 128 may further include any number of collection optical elements 132 to direct and/or modify illumination collected by the objective lens 124 including, but not limited to, one or more filters, one or more polarizers, or one or more beam blocks.

The detector 126 may include any type of optical detector known in the art suitable for measuring illumination received from the sample 114. For example, a detector 126 may include, but is not limited to, a CCD detector, a TDI detector, a photomultiplier tube (PMT), an avalanche photodiode (APD), or the like. In another embodiment, a detector 126 may include a spectroscopic detector suitable for identifying wavelengths of radiation emanating from the sample 114. In another embodiment, the metrology tool 102 may include multiple detectors 126 (e.g., associated with multiple beam paths generated by one or more beamsplitters to facilitate multiple metrology measurements by the metrology tool 102).

In one embodiment, as illustrated in FIG. 1B, the metrology tool 102 may include a beamsplitter 134 oriented such that the objective lens 124 may simultaneously direct the illumination beam 112 to the sample 114 and collect radiation emanating from the sample 114. In this regard, the metrology tool 102 may be configured in an epi-illumination mode. In another embodiment, the angle of incidence of the illumination beam 112 on the sample 114 is adjustable. For example, the path of the illumination beam 112 through the beamsplitter 134 and the objective lens 124 may be adjusted to control the angle of incidence of the illumination beam 112 on the sample 114.

In another embodiment, the metrology tool 102 is communicatively coupled to the controller 104 of metrology system 100. In this regard, the controller 104 may be configured to receive data including, but not limited to, metrology images.

FIG. 1C is a conceptual view of a metrology tool 102 configured as a particle beam metrology tool, in accordance with one or more embodiments of the present disclosure. In one embodiment, the illumination source 110 includes a particle source (e.g., an electron beam source, an ion beam source, or the like) such that the illumination beam 112 includes a particle beam (e.g., an electron beam, a particle beam, or the like). The illumination source 110 may include any particle source known in the art suitable for generating an illumination beam 112. For example, the illumination source 110 may include, but is not limited to, an electron gun or an ion gun. In another embodiment, the illumination source 110 is configured to provide a particle beam with a tunable energy. For example, an illumination source 110 including an electron source may, but is not limited to, provide an accelerating voltage in the range of 0.1 kV to 30 kV. As another example, an illumination source 110 including an ion source may, but is not required to, provide an ion beam with an energy in the range of 1 to 50 keV.

In another embodiment, the illumination pathway 118 includes one or more particle focusing elements (e.g., lenses 120, or the like). For example, the one or more particle focusing elements may include, but are not limited to, a single particle focusing element or one or more particle focusing elements forming a compound system. In another embodiment, the one or more particle focusing elements include objective lens 124 configured to direct the illumination beam 112 to the sample 114. Further, the one or more particle focusing elements may include any type of electron lenses known in the art including, but not limited to, electrostatic, magnetic, uni-potential, or double-potential lenses. It is noted herein that the description of an imaging metrology tool as depicted in FIG. 1C and the associated descriptions above are provided solely for illustrative purposes and should not be interpreted as limiting. For example, the metrology tool 102 may include any excitation source known in the art suitable for generating metrology data on a sample 114. In another embodiment, the metrology tool 102 includes two or more particle beam sources (e.g., electron beam sources or ion beam sources) for the generation of two or more particle beams. In a further embodiment, the metrology tool 102 may include one or more components (e.g., one or more electrodes) configured to apply one or more voltages to one or more locations of the sample 114. In this regard, the metrology tool 102 may generate voltage contrast imaging data.

In another embodiment, the metrology tool 102 includes one or more particle detectors 126 to image or otherwise detect particles emanating from the sample 114. In one embodiment, the detector 126 includes an electron collector (e.g., a secondary electron collector, a backscattered electron detector, or the like). In another embodiment, the detector 126 includes a photon detector (e.g., a photodetector, an x-ray detector, a scintillating element coupled to photomultiplier tube (PMT) detector, or the like) for detecting electrons and/or photons from the sample surface.

Figure 2:
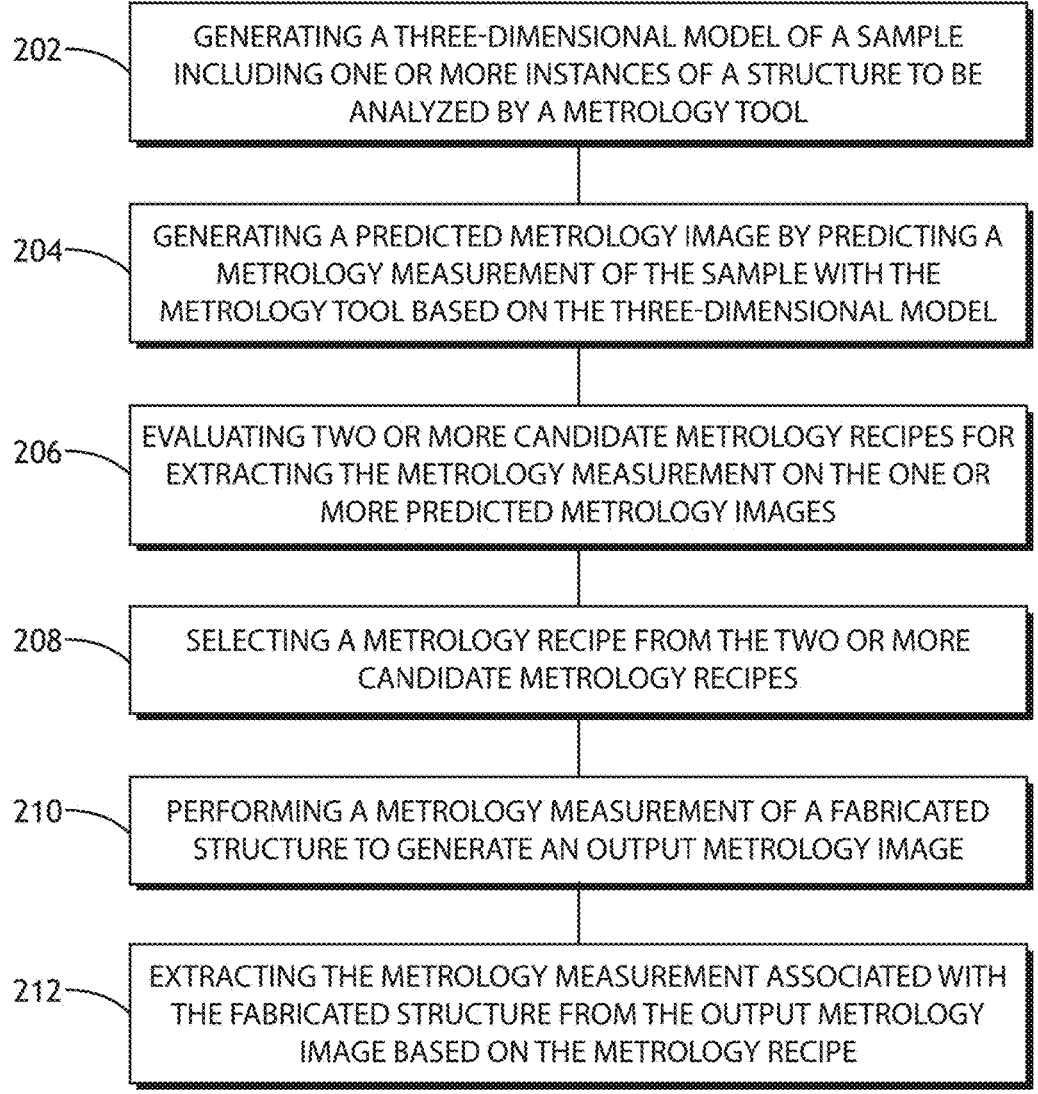
FIG. 2 is a flow diagram illustrating steps performed in a method for metrology, in accordance with one or more embodiments of the present disclosure.

FIG. 2 is a flow diagram illustrating steps performed in a method 200 for metrology, in accordance with one or more embodiments of the present disclosure. Applicant notes that the embodiments and enabling technologies described previously herein in the context of metrology system 100 should be interpreted to extend to method 200. It is further noted, however, that the method 200 is not limited to the architecture of metrology system 100.

In one embodiment, the method 200 includes a step 202 of generating a three-dimensional model of a sample including one or more instances of a structure to be analyzed by a metrology tool. For example, the step 202 may include generating with the controller 104 of metrology system 100 a three-dimensional model of a sample including one or more instances of a structure to be analyzed by the metrology tool 102.

The structure to be analyzed may include any type of structure suitable for fabrication and analysis with the metrology tool. Further, the structure to be analyzed may be intended for any purpose. For example, the structure may include an overlay target sensitive to relative alignment of two or more layers on a sample. By way of another example, the structure may include a dose-monitoring target sensitive to the dose of illumination energy during fabrication. By way of another example, the structure may include a focus-monitoring target sensitive to the position of the sample in a lithography tool during fabrication. By way of a further example, the structure may include any pattern elements or series of pattern elements suitable for inspection for fabrication defects.

Referring generally to FIGS. 3A through 7B, the creation of a metrology recipe to extract an overlay metrology measurement from an overlay target is described. It is to be understood, however, that FIGS. 3A through 7B, along with the associated descriptions below, are provided solely for illustrative purposes and should not be interpreted as limiting. Metrology recipes generated for any type of structure of interest on any type of sample of interest are within the spirit and scope of the present disclosure.

Figure 3A:
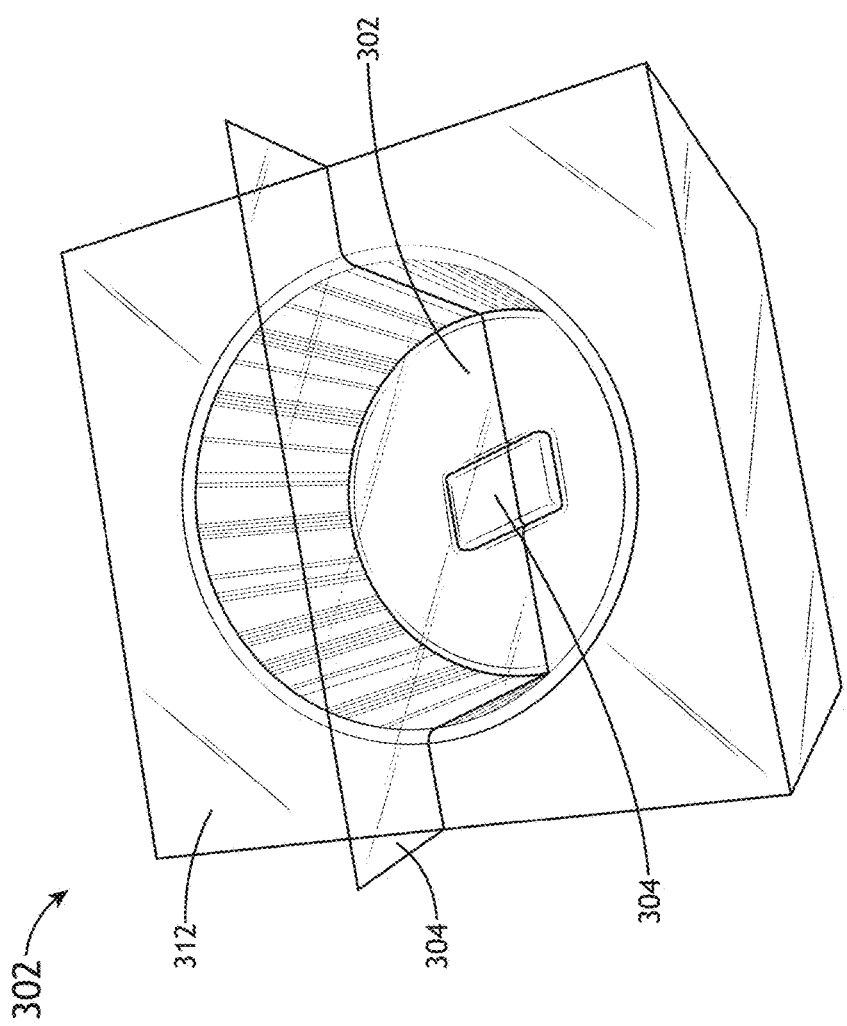
FIG. 3A is a perspective view of a model of an overlay structure for which a metrology recipe for extracting an overlay metrology measurement may be created, in accordance with one or more embodiments of the present disclosure.
Figure 3B:
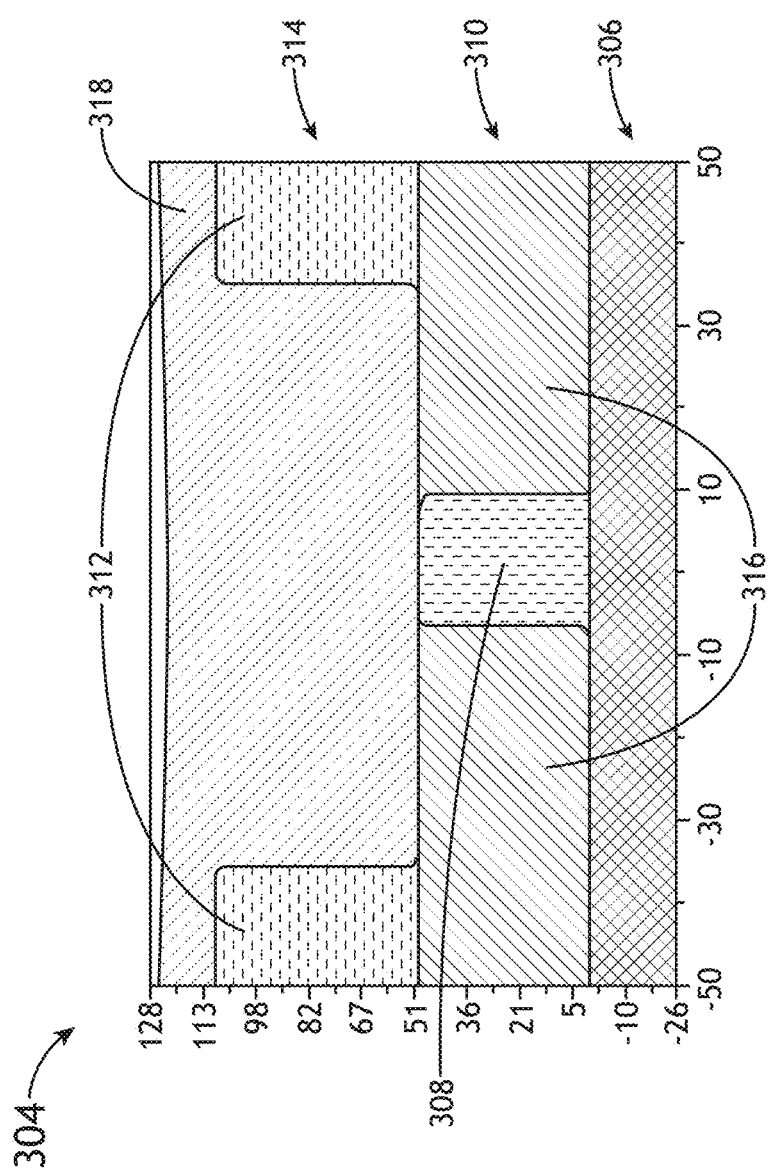
FIG. 3B is a cross-section view of the overlay structure associated with a cross-section of FIG. 3A, in accordance with one or more embodiments of the present disclosure.

FIG. 3A is a perspective view of a model of an overlay structure 302 for which a metrology recipe for extracting an overlay metrology measurement may be created, in accordance with one or more embodiments of the present disclosure. FIG. 3B is a cross-section view of the overlay structure 302 associated with a cross-section 304 of FIG. 3A, in accordance with one or more embodiments of the present disclosure.

As described previously herein, a structure of interest (e.g., a structure for which an associated metrology measurement is desired) may include one or more patterned material layers on a sample. In one embodiment, the three-dimensional model includes a representation of one or more pattern elements formed out of one or more patterned material layers. For example, the three-dimensional model may include the size, shape, and/or orientation of pattern elements on one or more layers. Further, the three-dimensional model may include the composition of patterned material layers.

Referring to FIGS. 3A and 3B, the three-dimensional model of the overlay structure 302 may include a substrate layer 306 (e.g., a semiconductor wafer, or the like) on which additional layers are deposited, a first set of one or more pattern elements 308 on a first layer 310, and a second set of one or more pattern elements 312 on a second layer 314. For example, as illustrated in FIGS. 3A and 3B, the first set of one or more pattern elements 308 may include, but is not limited to, a rectangular pattern element, and the second set of one or more pattern elements 312 may include, but is not limited to, an open circular pattern nominally centered on the rectangular pattern element. In this regard, the rectangular pattern element may be visible in an image of the structure generated with the metrology tool, and an overlay metrology metric may include a relative position of the rectangular pattern element with respect to a center position of the open circular pattern. It is noted that the overlay structure 302 may be, but is not required to be, suitable for overlay measurements using an electron-beam metrology tool (e.g., the metrology tool 102 illustrated in FIG. 1C, or the like).

The three-dimensional model may further include one or more portions of sample layers that may not directly be associated with a metrology metric of interest. For example, the three-dimensional model may include one or more fill layers that may provide structural support for the structure. For instance, as illustrated in FIG. 3B, the three-dimensional model may include a first fill layer 316 in the first layer 310 and a second fill layer 318 in the second layer 314.

In another embodiment, the three-dimensional model includes dimensions of the structure of interest. For example, the first set of one or more pattern elements 308 and the first fill layer 316 may have a nominal thickness of 50 nm, the second set of one or more pattern elements 312 may have a nominal thickness of 60 nm, and the second fill layer 318 may have a thickness of 70 nm. Further, the first set of one or more pattern elements 308 may have a nominal width of 18 nm, and the second set of one or more pattern elements 312 may have a nominal diameter of 70 nm.

In another embodiment, the three-dimensional model includes compositions of the associated material layers. For example, the substrate layer 306 and the first set of one or more pattern elements 308 may be formed from silicon, the first fill layer 316 and the second set of one or more pattern elements 312 may be formed from silicon dioxide, and the second fill layer 318 may be fabricated from a resist material. In another embodiment, the three-dimensional model includes properties such as, but not limited to, chemical, mechanical, electrical, or optical properties of the one or more material layers.

In another embodiment, the three-dimensional model is based on a design of the structure. For example, the three-dimensional model may include nominal design values of the size, shape, sidewall angles, orientation, composition, properties, or the like of pattern elements on associated material layers.

In another embodiment, the three-dimensional model is based on predicted values. For example, the step 202 may include predicting one or more aspects of the structure based on fabrication of the structure with a selected process tool. In this regard, the three-dimensional model may account for deviations of a fabricated structure from design values. For example, an exposed pattern element on a sample may deviate from a designed pattern element (e.g., associated with a pattern mask) due to a finite resolution of a lithography tool, aberrations, turbulence, diffraction effects, scattering effects, and the like. By way of another example, a pattern element generated by etching a portion of a sample layer (e.g., an exposed portion or an unexposed portion) may deviate from the exposed pattern element due to a finite etch contrast ratio between exposed and unexposed portions of the sample, diffusion effects, or the like. Accordingly, the step 202 may predict aspects of fabricated pattern elements based on specific considerations of the fabrication process.

Prediction of one or more aspects of the structure in step 202 may be performed using any method known in the art such as, but not limited to, simulations, emulations, or machine learning techniques.

For example, step 202 may include simulations of one or more process steps of a selected process tool (or set of tools) for the fabrication of the structure. In one instance, simulations of process steps may include simulations using conceptual models, heuristics, or the like suitable for generating a three-dimensional model of the structure within a selected specification. By way of another example, step 202 may include emulations in which the physical, chemical, electrical, and/or optical interactions of a selected process tool (or set of tools) are replicated to emulate the operation of the selected process tool within a selected specification.

For instance, optical interaction of an illumination beam (e.g., associated with a lithography tool) with a sample may be, but is not required to be, modeled using an electromagnetic (EM) solver. Further, the EM solver may utilize any method known in the art including, but not limited to, rigorous coupled-wave analysis (RCWA), finite element method analysis, method of moments analysis, a surface integral technique, a volume integral technique, or a finite-difference time-domain analysis. A geometric engine is implemented, for example, in AcuShape software provided by KLA-TENCOR. Further, a three-dimensional model of multiple patterning stacks forming a structure based on selected process steps and associated material compositions may be implemented, for example, in PROLITH software provided by KLA-TENCOR.

By way of a further example, step 202 may utilize machine learning, neural networks, or the like to predict one or more aspects of a fabricated structure based on a set of training images. For example, step 202 may generate the three-dimensional model using deep generative modeling (DGM). Further, the training images may be generated by any method known in the art such as, but not limited to, actual or simulated images of fabricated structures with systematically varying characteristics under systematically varying fabrication conditions.

It is recognized herein that the precise composition and/or properties of some materials may vary depending on the nature of the fabrication and/or the size of pattern elements. For example, the composition and/or properties of thin films may vary based on the deposition method as well as the thermal history of the film (e.g., freshly deposited, annealed, or the like). Accordingly, predicting one or more aspects of the structure based on fabrication of the structure with a selected process tool in step 202 may include highly accurate representations of fabricated structures.

In another embodiment, the method 200 includes a step 204 of generating one or more predicted metrology images corresponding to a predicted analysis of the sample with the metrology tool based on the three-dimensional model. For example, step 204 may include generating, with the controller 104, a predicted metrology image corresponding to a predicted analysis of the sample 114 with the metrology tool 102 based on the three-dimensional model.

In one embodiment, a predicted metrology image generated in step 204 includes predicted deviations from a two-dimensional projection of the three-dimensional model based on a predicted analysis of the sample with the metrology tool. For example, a predicted metrology image may include a projection of the three-dimensional model to represent a predicted analysis of the sample with the metrology tool (e.g., a two-dimensional projection of the three-dimensional model based on a particular configuration of the various components of the metrology tool). The projection of the three-dimensional model may thus represent a first-order prediction of an output image that may be generated by the metrology tool. Further, the projection of the three-dimensional model may represent, but is not required to represent, an idealized predicted image (e.g., a ground truth image, or the like). However, it may typically be the case that an actual output image from a metrology tool includes various sources of noise such that the actual output image may deviate from the projection of the three-dimensional model. Accordingly, a predicted metrology image generated in step 204 may include predicted deviations from the projection of the three-dimensional model.

Deviations from the projection of the three-dimensional model may be characterized as noise. In this regard, a predicted metrology image generated in step 204 may include multiple sources of noise. For example, a predicted metrology image generated in step 204 may include predicted tool noise associated with a metrology measurement by the metrology tool. For instance, tool noise may include noise associated with a finite resolution of the metrology tool (e.g., manifested as blur). In another instance, tool noise may include noise associated with mechanical vibrations, atmospheric turbulence, fluctuations of the intensity of an illumination beam, or the like. In another instance, tool noise may include shadowing artifacts associated with the analysis of the particular topography of the sample with the metrology tool. Shadowing artifacts may be present, for example, in scanning metrology tools in which an image is generated point by point based on scanning an illumination beam across the sample or by directly imaging metrology tools in which a portion of the sample is imaged based on broad illumination of the sample. In another instance, tool noise may include detector noise such as, but not limited to, saturation effects, insufficient contrast, or the like.

By way of another example, a predicted metrology image generated in step 204 may include predicted sample noise associated with variations in sample properties (e.g., physical properties, topography, chemical properties, optical properties, or the like) across the sample that may lead to deviations of an output metrology image from the projection of the three-dimensional model. For instance, variations in the sample topography (e.g., proximate to feature edges, and the like) may induce unequal charging effects across the sample in an electron beam metrology tool that may manifest as variations in image intensity. Further, such charging effects may depend on specific characteristics of the metrology tool or the metrology recipe such as, but not limited to, a scan rate of an illumination beam, an energy or intensity of the illumination beam, or the field of view during a measurement. Such image intensity variations may be predicted in step 204 to provide an accurate prediction of an image of a particular sample generated by the metrology tool.

Further, sample noise may include predicted deviations of a fabricated sample from the three-dimensional model due to variations of the fabrication process (e.g., process variations). For example, it may be the case that physical characteristics of a sample (e.g., pattern placement error, overlay values, layer thicknesses, sidewall angles, or the like) of fabricated structures may vary across a wafer and/or across different production runs. Accordingly, a predicted metrology image generated in step 204 may include predicted deviations of the sample itself from a projection of the three-dimensional model.

By way of another example, a predicted metrology image generated in step 204 may include predicted stochastic (e.g., random) noise associated with any point in the fabrication or metrology process. For example, a predicted metrology image generated in step 204 may include predicted shot noise of a detector in the metrology tool, photon shot noise associated with absorption of photons by the sample during fabrication and/or metrology, or the like.

Further, the sources of noise associated with fabrication of the structure or measurement in a metrology tool may manifest in multiple ways in an output metrology image of the metrology tool. Accordingly, a predicted metrology image generated in step 204 may include varied manifestations of noise. Further, it may be the case that multiple sources of noise may manifest in the same way in the predicted metrology image. For example, the predicted metrology image may include white noise manifested as speckle. By way of another example, the predicted metrology image may include Gaussian noise, or blur. By way of another example, the predicted metrology image may include distortions of the structure such as, but not limited to, line edge roughness (LER), linewidth roughness (LWR), or rounded corners. By way of a further example, the predicted metrology image may include systematic intensity noise. For instance, material charging in a SEM image may manifest as lighter pixels (e.g., increased grayscale intensity) that may produce a false appearance of topography variations.

A predicted metrology image may be generated in step 204 through any method known in the art. In one embodiment, step 204 includes convolving one or more noise distributions with a projection of the three-dimensional model of step 202. In another embodiment, step 204 directly generates one or more predicted metrology images based on the three-dimensional model and predicted noise sources. In this regard, an ideal projection of the three-dimensional model need not be separately generated.

The one or more predicted metrology images may be generated in step 204 using a variety of techniques such as, but not limited to, simulations, emulations, or machine learning techniques.

For example, step 204 may include metrology simulations for the generation of the predicted metrology image. In one instance, simulations of the metrology tool may include simulations using conceptual models, heuristics, or the like suitable for providing an image representative of an output of the metrology tool within a selected specification. By way of another example, step 204 may include emulations in which the physical, chemical, electrical, and/or optical interactions of the metrology tool with the sample are replicated to emulate the operation of the metrology tool within a selected specification.

For instance, interaction of an optical illumination beam with a sample may be, but is not required to be, modeled using an electro-magnetic (EM) solver. In another instance, interaction of a particle illumination beam may be modeled using a SEM simulator (e.g., a CD-SEM simulator, or the like). A SEM simulator is implemented, for example, in PROLITH software provided by KLA-TENCOR. In another instance, the interaction of an optical illumination beam or a particle illumination beam with the sample may be implemented any method known in the art including, but not limited to, rigorous coupled-wave analysis (RCWA), finite element method analysis, method of moments analysis, a surface integral technique, a volume integral technique, or a finite-difference time-domain analysis. A geometric engine is implemented, for example, in AcuShape software provided by KLA-TENCOR.

By way of a further example, step 204 may utilize machine learning, neural networks, or the like to generate a predicted metrology image. For example, step 204 may generate the three-dimensional model using deep generative modeling (DGM). Further, the training images may be generated by any method known in the art such as, but not limited to, actual or simulated images of fabricated structures with systematically varying characteristics analyzed with the metrology tool.

The step 204 may include generating any number of predicted metrology images representative of predicted outputs of the metrology tool. Further, a predicted metrology image generated in step 204 may include any number of instances of the structure of interest modeled in step 202.

For example, step 204 may include a series of images (either as sub-images of a composite image or as separate images) in which one or more aspects of fabrication or metrology measurement are varied. For instance, the one or more metrology images generated in step 204 may include multiple predictions (e.g., simulations, emulations, or the like) of the same fabricated structure. In this regard, the effects of certain noise sources such as, but not limited to, stochastic noise sources, may be evaluated. In another instance, the one or more metrology images generated in step 204 may include multiple instances of the structure of interest in which one or more attributes of the structure (e.g., overlay values, layer thicknesses, sidewall angles, or the like) are systematically varied to represent systematic variations in a fabrication process. In this regard, the impacts of deviations in the fabrication process may be evaluated.

Figure 4:
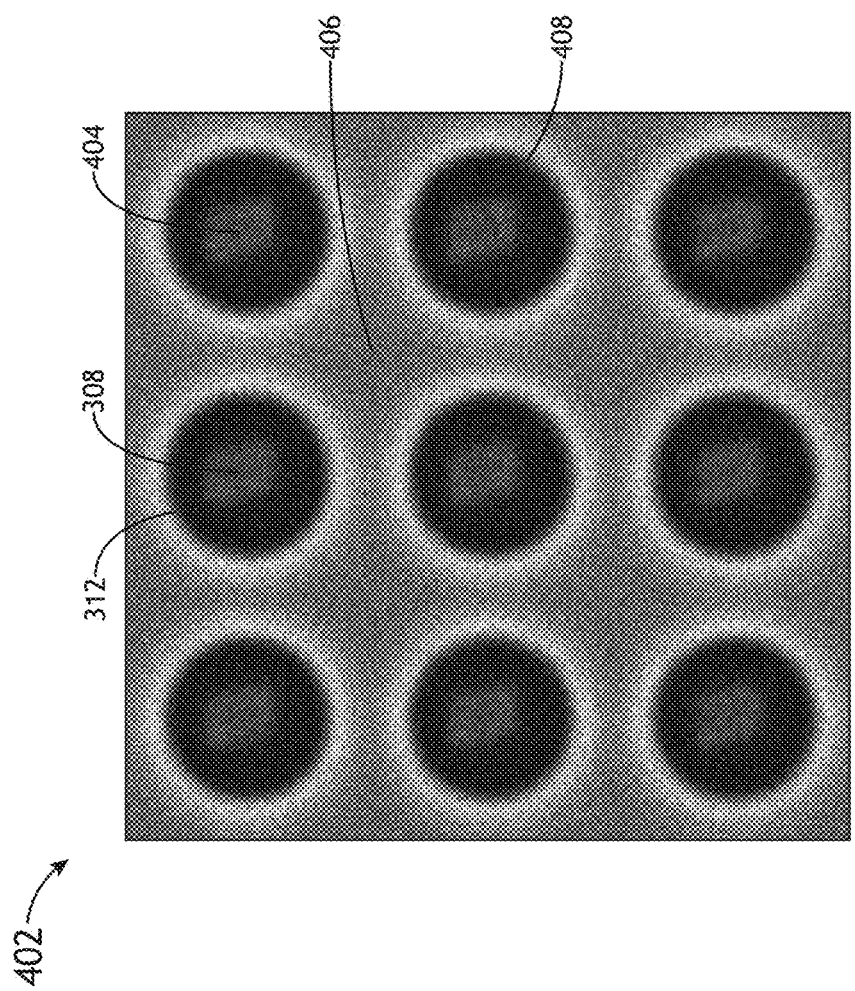
FIG. 4 is a predicted metrology image of a sample including multiple instances of the overlay structure in FIGS. 3A and 3B, in accordance with one or more embodiments of the present disclosure.

FIG. 4 is a predicted metrology image 402 of a sample including multiple instances 404 of the overlay structure 302 in FIGS. 3A and 3B, in accordance with one or more embodiments of the present disclosure. Each instance 404 of the predicted metrology image 402 in FIG. 4 is generated with different overlay values, or relative positions between the rectangular pattern element of the first set of one or more pattern elements 308 and the open circular pattern of the second set of one or more pattern elements 312.

Further, the predicted metrology image 402 includes multiple sources of noise superimposed on the instances 404 of the overlay structure 302. For example, white noise manifested as speckle is incorporated over the entire image, but may be particularly observable in region 406. By way of another example, the predicted metrology image 402 includes charging noise located on the edges 408 of the open circular pattern of the second set of one or more pattern elements 312 indicative of predicted charging by an electron beam during analysis by the metrology tool (e.g., the metrology tool 102 illustrated in FIG. 1C).

In another embodiment, the method 200 includes a step 206 of evaluating two or more candidate metrology recipes for extracting the metrology measurement from the one or more predicted metrology images.

A metrology recipe may include one or more steps for analyzing an image of the structure to extract a desired metrology measurement of the fabricated structure. For example, a metrology recipe may include adjusting one or more image parameters such as, but not limited to, contrast or brightness. By way of another example, a metrology recipe may include one or more image processing steps to prepare an image. For instance, a metrology recipe may include, but is not required to include, applying one or more image filters (e.g., a speckle reduction filter, a Gaussian blur filter, a sharpening filter, or the like), morphological image processing techniques (e.g., image opening, image closing, or the like), edge-finding techniques, object recognition techniques, or the like. By way of another example, a metrology recipe may include selecting one or more regions of interest for analysis. By way of another example, a metrology recipe may include analysis of pixel values to determine patterns, thresholds, or the like indicative of a desired metrology measurement.

Referring to FIGS. 5A through 6B, potential steps associated with candidate metrology recipes for measuring overlay on a portion of the predicted metrology image 402 in FIG. 4 are illustrated. It is to be understood, however, that FIGS. 5A through 6B are provided solely for illustrative purposes and should not be interpreted as limiting. For example, a candidate metrology recipe created in step 206 may be generated based on an entire predicted metrology image, or a selected portion of a metrology image. Further, a candidate metrology recipe created in step 206 may include any number of steps suitable for extracting a desired metrology metric different from or in addition to steps illustrated herein.

FIG. 5A is an image 502 of a portion of the predicted metrology image 402 including a single instance of the overlay structure 302, in accordance with one or more embodiments of the present disclosure. For example, FIG. 5A includes two regions of interest 504 containing orthogonal slices of both the rectangular pattern element of the first set of one or more pattern elements 308 and the open circular pattern of the second set of one or more pattern elements 312 for measurement of overly in orthogonal directions. FIG. 5B is an image 506 including a modified version of FIG. 5A in which the edges of the rectangular pattern element of the first set of one or more pattern elements 308 and the open circular pattern of the second set of one or more pattern elements 312 have been identified by one or more image analysis steps including an edge-finding technique, in accordance with one or more embodiments of the present disclosure. Accordingly, an overlay metrology measurement may be determined in each of the orthogonal directions by measuring the relative locations of the edges in the regions of interest 504.

It is recognized herein that a given metrology measurement (e.g., overlay) may be performed to characterize a given image of a structure using a wide range of metrology recipes. For example, considering FIG. 5B, an overly measurement in the horizontal direction along a single line of pixels may be determined by comparing a center pixel of the rectangular pattern element of the first set of one or more pattern elements 308 and a center pixel of the open circular pattern of the second set of one or more pattern elements 312. By way of another example, an overlay measurement in the horizontal direction may be determined by comparing an average center pixel of the rectangular pattern element of the first set of one or more pattern elements 308 for two or more lines of pixels with an average center pixel of the open circular pattern of the second set of one or more pattern elements 312 for the same two or more lines of pixels. By way of another example, an overlay measurement may be performed by comparing a (X,Y) position of a centroid of the rectangular pattern element of the first set of one or more pattern elements 308 to an (X,Y) position of a centroid of the open circular pattern of the second set of one or more pattern elements 312.

Figure 6A:
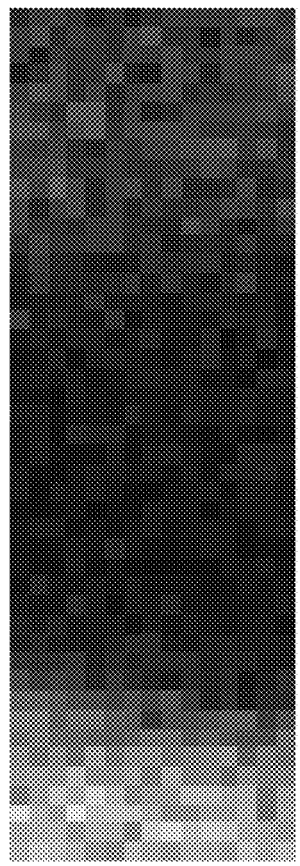
FIG. 6A is an image illustrating a portion of a predicted metrology image including an edge of a rectangular pattern element and an edge of an open circular pattern, in accordance with one or more embodiments of the present disclosure.
Figure 6B:
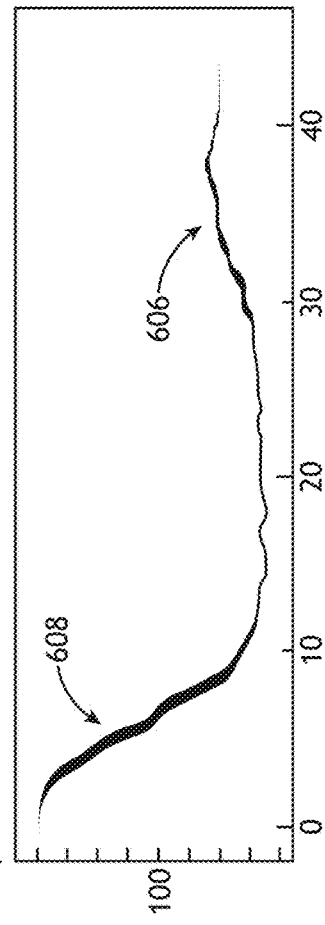
FIG. 6B is a plot of the pixel intensity across a single pixel line of FIG. 6A, in accordance with one or more embodiments of the present disclosure.

Further, candidate metrology recipes may differ based on parameters and/or thresholds used within image analysis steps. FIG. 6A is an image 602 illustrating a portion of the predicted metrology image 402 including an edge of the rectangular pattern element of the first set of one or more pattern elements 308 and an edge of the open circular pattern of the second set of one or more pattern elements 312, in accordance with one or more embodiments of the present disclosure. FIG. 6B is a plot 604 of the pixel intensity across a single pixel line of FIG. 6A, in accordance with one or more embodiments of the present disclosure. FIG. 6B illustrates a first gradual transition 606 associated with the rectangular pattern element of the first set of one or more pattern elements 308 and a second gradual transition 608 associated with the open circular pattern of the second set of one or more pattern elements 312.

In this regard, a candidate metrology recipe created in step 206 may include selected parameters applied in image analysis steps to extract the metrology metric. Continuing the example here, the edges of FIG. 5B may be determined through selecting thresholds for an edge detection analysis. For example, the edges of the rectangular pattern element of the first set of one or more pattern elements 308 may be, but are not required to be, defined based on pixel intensity rising above 40, as defined by the Y axis, in a cross-section similar to FIG. 6B. Similarly, the edges of the open circular pattern of the second set of one or more pattern elements 312 may be, but are not required to be, defined based on pixel intensity rising above 100 in a cross-section similar to FIG. 6B.

The step 206 may include generating two or more two or more candidate metrology recipes suitable for extracting a desired metrology metric. The two or more candidate metrology recipes may include, but are not limited to, different image processing analysis techniques (e.g., different edge-finding techniques suitable for generating image 602 in the example above, different image filters, or the like), different parameters used to tune a given analysis technique, or different regions of the sample to analyze. Further, the step 206 may include evaluating the two or more candidate metrology recipes. In this regard, the two or more candidate metrology recipes may be applied to the one or more predicted metrology images generated in step 204.

In another embodiment, the method 200 includes a step 208 of selecting a metrology recipe from the two or more candidate metrology recipes for extracting a metrology measurement from an image of the structure from the metrology tool.

In one embodiment, step 208 includes selecting a metrology recipe from the two or more candidate metrology recipes based on one or more selection metrics. It is recognized herein that different metrology recipes may potentially be utilized to extract a given metrology measurement from an image. However, not all metrology recipes may have the same level of performance or degree of robustness to noise (e.g., tool noise, sample noise, process noise, or the like). Accordingly, it may be desirable to select metrology recipes that provide a desired level of performance based on any number of selected selection metrics.

For example, the one or more selection metrics may include an accuracy of the extracted metrology measurement (e.g., critical dimension, overlay, sidewall angle, or the like). It is typically desirable for a metrology recipe to extract a value of the metrology metric from an image of a sample that accurately reflects the actual value of the metrology metric on the sample.

By way of another example, the one or more selection metrics may include a robustness of the extracted metrology measurement to one or more sources of noise. The robustness of the extracted metrology measurement to noise may be evaluated for each candidate metrology recipe, for example, by generating multiple noisy predicted metrology images (or sub-images of a composite image). A selection metric indicative of robustness of the extracted metrology measurement to tool noise may then include a measure of the variance of the values of extracted metrology measurements in response to the noise.

For instance, continuing the example above, the first gradual transition 606 of FIG. 6B has a relatively lower slope than the second gradual transition 608. Accordingly, slight deviations of a particular metrology image of the structure (e.g., associated with different charging effects 408, different image contrast, or the like) may have a greater impact on the extracted edge from the first gradual transition 606 than for the second gradual transition 608. Thus, a metrology recipe may utilize a more robust technique to determine an edge in the first gradual transition region 606 than for determining an edge in the second gradual transition region 608.

Further, separate selection metrics may be, but are not required to be, generated for different noise sources. For instance, a selection metric may include robustness to tool noise associated with the metrology tool (e.g., shot noise in the detector, shadowing artifacts, charging artifacts, or the like). In another instance, a selection metric may include robustness to sample noise associated with deviations of sample properties (e.g., process noise associated with deviations of the fabrication process, or the like).

In one embodiment, a design of experiments (DOE) may be developed to generate multiple predicted metrology images (e.g., in step 204) with systematic variations. For example, the predicted metrology images may include a DOE with systematic variations of sample dimensions representative of process deviations to determine the robustness of each candidate metrology recipe to the process deviations. By way of another example, the predicted metrology images may include a DOE with systematic variations of measurement parameters by the metrology tool (e.g., energy of an illumination beam, scan speed of an illumination beam, or the like) to determine the robustness of each candidate metrology recipe to deterministic tool noise (e.g., shadowing artifacts, charging artifacts, or the like). By way of another example, the DOE may include multiple runs of identical predicted metrology images to determine the robustness of each candidate metrology recipe to stochastic noise (e.g., shot noise, or the like).

In another embodiment, selecting the metrology recipe in step 208 comprises performing a multivariate analysis of the candidate metrology targets based on two or more selection metrics. The multivariate analysis may include any type of multivariate analysis known in the art such as, but not limited to, a regression analysis. In this regard, a metrology recipe selected in step 208 may provide a desired level of performance by balancing multiple selection metrics.

Figure 7B:
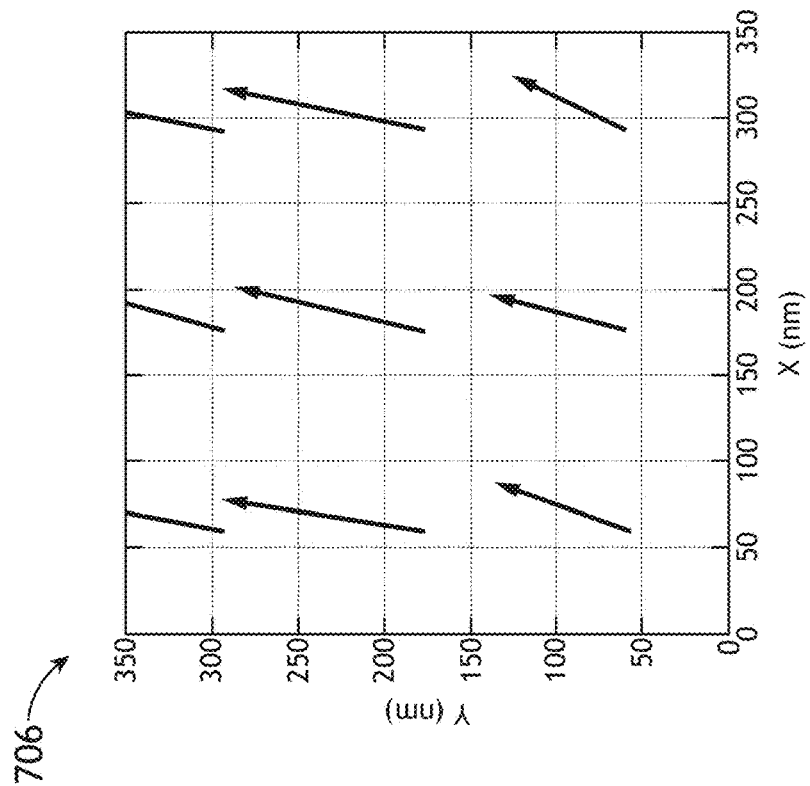
FIG. 7B is a plot of the overlay metrology measurements associated with each of the regions of interest in FIG. 7A, in accordance with one or more embodiments of the present disclosure.
Figure 7A:
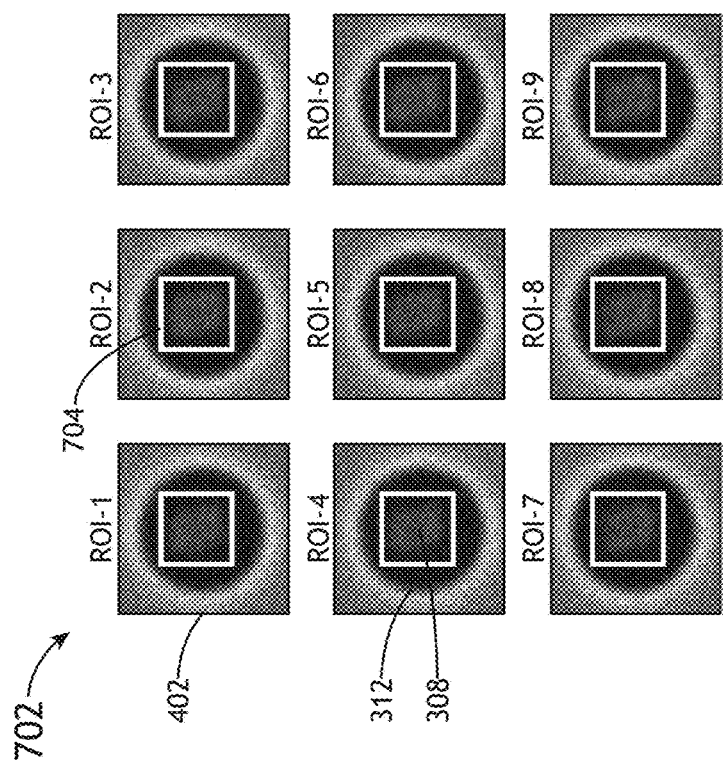
FIG. 7A includes a series of modified images illustrating regions of interest of a predicted metrology image associated with systematically varying overlay values, in accordance with one or more embodiments of the present disclosure.

Referring now generally to FIGS. 7A and 7B, a design of experiments in which an overlay metrology metric is systematically varied is shown. FIG. 7A includes a series of modified images 702 illustrating regions of interest (e.g., ROI-1 through ROI-9) of the predicted metrology image 402 of FIG. 4 associated with systematically varying overlay values, in accordance with one or more embodiments of the present disclosure. Further, each region of interest includes a sub-region of interest 704 identifying the rectangular pattern element of the first set of one or more pattern elements 308. FIG. 7B is a plot 706 of the overlay metrology measurements (e.g., overlay vectors) associated with each of the regions of interest (ROI-1 through ROI-9) in FIG. 7A, in accordance with one or more embodiments of the present disclosure.

Accordingly, a predicted metrology image (e.g., predicted metrology image 402) may provide a design of experiments in which various candidate metrology recipes may be evaluated. For example, candidate metrology recipes may be applied (e.g., in step 206) to each region of interest in FIG. 7 (e.g., ROI-1 through ROI-9) to determine a sensitivity to deviations of the fabrication process. Further, a metrology recipe may be selected (e.g., in step 208) based on chosen selection metrics such as, but not limited to, accuracy of the overlay measurement and robustness to various noise sources (e.g., tool noise, sample noise, process noise, or the like).

In another embodiment, the method 200 includes a step 210 of performing, with the metrology tool (e.g., the metrology tool 102), a metrology measurement of a fabricated structure to generate an output metrology image. For example, step 210 may include fabricating a sample with one or more instances of the structure modeled in step 202.

In another embodiment, the method 200 includes a step 212 of extracting the metrology measurement associated with the fabricated structure from the output metrology image based on the metrology recipe. For example, step 212 may include extracting, with the controller 104, the metrology measurement associated with the fabricated structure from the output metrology image based on the metrology recipe.

Figures 8A, 8B:
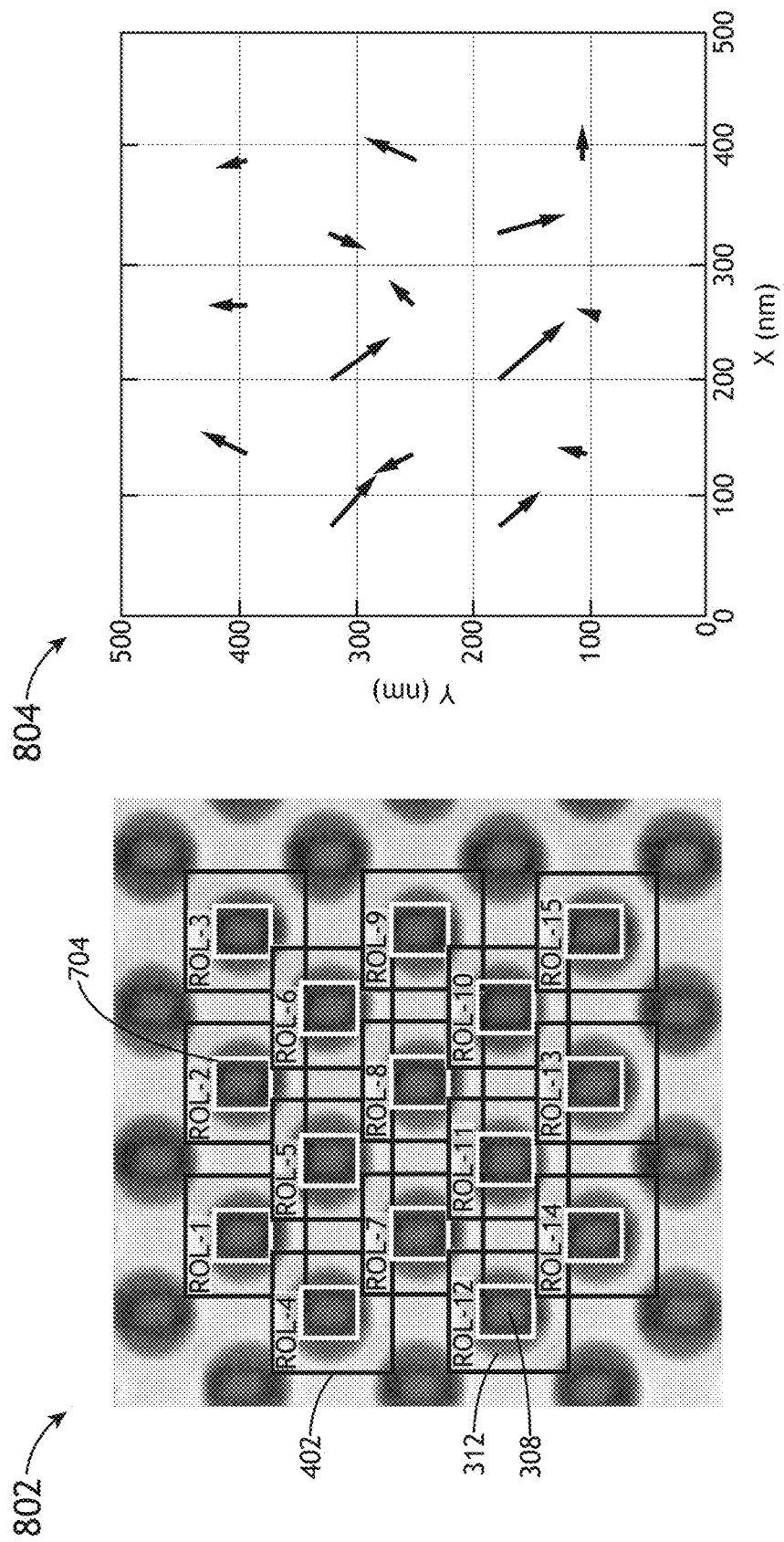
FIG. 8A is a modified output metrology image associated with analysis of a fabricated sample with multiple instances of a structure illustrating regions of interest, in accordance with one or more embodiments of the present disclosure.
FIG. 8B is a plot of the overlay metrology measurements associated with each of the regions of interest of FIG. 8A, in accordance with one or more embodiments of the present disclosure.

FIG. 8A is a modified output metrology image 802 associated with analysis of a fabricated sample with multiple instances of a structure illustrating regions of interest (e.g., ROI-1 through ROI-15), in accordance with one or more embodiments of the present disclosure. Further, each region of interest includes a sub-region of interest 704 identifying the rectangular pattern element of the first set of one or more pattern elements 308. FIG. 8B is a plot 804 of the overlay metrology measurements (e.g., overlay vectors) associated with each of the regions of interest (ROI-1 through ROI-15) of FIG. 8A, in accordance with one or more embodiments of the present disclosure. In this regard, a metrology recipe selected in step 208 based on the three-dimensional model generated in step 202 may be applied to fabricated samples.

Further, no prior testing of the metrology recipe on fabricated test samples is necessary.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
   a controller including one or more processors configured to execute instructions configured to cause the one or more processors to:
   generate a three-dimensional model of a sample including one or more instances of a structure to be analyzed by a metrology tool;
   generate one or more predicted metrology images corresponding to a predicted analysis of the sample with the metrology tool based on the three-dimensional model, wherein the predicted metrology image includes predicted deviations from a two-dimensional projection of the three-dimensional model based on the predicted analysis of the sample with the metrology tool;
   evaluate two or more candidate metrology recipes for extracting a metrology measurement from the one or more predicted metrology images;
   select, based on one or more selection metrics, a metrology recipe from the two or more candidate metrology recipes for extracting a metrology measurement from an image of the structure from the metrology tool;
   receive, from the metrology tool, an output metrology image of a fabricated structure based on a metrology measurement of the fabricated structure; and
   extract the metrology measurement associated with the fabricated structure from the output metrology image based on the metrology recipe.

2. The metrology system of claim 1, wherein the one or more selection metrics comprise:
   an accuracy of extracted metrology measurements from the one or more predicted metrology images.

3. The metrology system of claim 1, wherein the one or more selection metrics comprise:
   a robustness of the extracted metrology measurement to noise in the one or more predicted metrology images.

4. The metrology system of claim 3, wherein the robustness of the extracted metrology measurement to noise comprises:
   a variance of extracted metrology measurements from the one or more predicted metrology images.

5. The metrology system of claim 1, wherein the one or more predicted metrology images include two or more instances of the structure in which attributes of the structure are systematically varied to represent deviations in a fabrication process.

6. The metrology system of claim 5, wherein the one or more selection metrics comprise:
   a robustness of the extracted metrology measurement to the deviations in the fabrication process.

7. The metrology system of claim 5, wherein selecting a metrology recipe from the two or more candidate metrology recipes comprises:
   selecting the metrology recipe from the two or more candidate metrology recipes based on a multivariate analysis of an accuracy of the extracted metrology measurements on the one or more predicted metrology images and a robustness of the extracted metrology measurements to the deviations in the fabrication process.

8. The metrology system of claim 7, wherein the multivariate analysis comprises:
   a regression analysis.

9. The metrology system of claim 1, wherein generating the predicted metrology image comprises:
   simulating a metrology measurement of the sample by the metrology tool based on the three-dimensional model.

10. The metrology system of claim 9, wherein simulating the metrology measurement of the sample by the metrology tool based on the three-dimensional model comprises:
    simulating a metrology measurement of the sample by the metrology tool based on the three-dimensional model using a heuristic simulation model.

11. The metrology system of claim 1, wherein generating the predicted metrology image comprises:
    emulating a metrology measurement of the sample by the metrology tool based on the three-dimensional model.

12. The metrology system of claim 1, wherein generating the predicted metrology image comprises:
    generating the predicted metrology image based on deep generative modeling.

13. The metrology system of claim 12, wherein generating the predicted metrology image based on deep generative modeling comprises:
    training a deep generative model with a set of training images; and
    generating the predicted metrology image based on the deep generative model with the three-dimensional model of the structure as an input.

14. The metrology system of claim 13, wherein the set of training images comprises:
    at least one of images generated by the metrology tool based on metrology measurements of physical samples or images generated by simulating the output of the metrology tool based on modeled samples.

15. The metrology system of claim 1, wherein the predicted deviations from the two-dimensional projection of the three-dimensional model comprise:
at least one of stochastic noise associated with the fabrication of the structure or stochastic noise associated with the metrology measurement of the structure with the metrology tool.

16. The metrology system of claim 1, wherein the predicted deviations from the two-dimensional projection of the three-dimensional model comprise:
shot noise of a detector of the metrology tool.

17. The metrology system of claim 1, wherein the predicted deviations from the two-dimensional projection of the three-dimensional model comprise:
photon shot noise of absorption of an illumination beam of the metrology tool by the sample.

18. The metrology system of claim 1, wherein the predicted deviations from the two-dimensional projection of the three-dimensional model comprise:
shadowing artifacts associated with analysis of the sample with the metrology tool.

19. The metrology system of claim 1, wherein the predicted deviations from the two-dimensional projection of the three-dimensional model comprise:
image blur.

20. The metrology system of claim 1, wherein the metrology tool comprises:
an electron-beam metrology tool, wherein the predicted deviations from the two-dimensional projection of the three-dimensional model comprise:
charging artifacts associated with analysis of the sample with the electron-beam metrology tool.

21. The metrology system of claim 1, wherein the predicted deviations from the two-dimensional projection of the three-dimensional model comprise:
at least one of Gaussian noise or white noise.

22. The metrology system of claim 1, wherein the predicted deviations from the two-dimensional projection of the three-dimensional model comprise:
at least one of line edge roughness or linewidth roughness.

23. The metrology system of claim 1, wherein the three-dimensional model of the sample comprises:
one or more patterned material layers.

24. The metrology system of claim 23, wherein the three-dimensional model of the sample further comprises:
at least one of chemical, mechanical, electrical, or optical properties of the one or more patterned material layers.

25. The metrology system of claim 1, wherein generating the three-dimensional model of the structure comprises:
simulating one or more process steps of fabricating the structure with a selected process tool.

26. The metrology system of claim 1, wherein the structure comprises:
an overlay target, wherein the at least one metrology measurement comprises:
an overlay measurement.

27. The metrology system of claim 1, wherein the structure comprises:
a reticle, wherein the at least one metrology measurement comprises:
at least one of a reticle metrology measurement or a reticle inspection measurement.

28. The metrology system of claim 1, wherein the structure comprises:
a pattern to be inspected for fabrication defects, wherein the at least one metrology measurement comprises:
a defect inspection measurement.

29. A metrology system comprising:
a metrology tool; and
a controller including one or more processors configured to execute instructions configured to cause the one or more processors to:
generate a three-dimensional model of a sample including one or more instances of a structure to be analyzed by the metrology tool;
generate one or more predicted metrology images corresponding to a predicted analysis of the structure with the metrology tool based on the three-dimensional model, wherein the predicted metrology image includes predicted deviations from a two-dimensional projection of the three-dimensional model based on the predicted analysis of the sample with the metrology tool;
evaluate two or more candidate metrology recipes for extracting a metrology measurement from the one or more predicted metrology images;
select, based on one or more selection metrics, a metrology recipe from the two or more candidate metrology recipes for extracting a metrology measurement from an image of the structure from the metrology tool;
receive, from the metrology tool, an output metrology image of a fabricated structure based on a metrology measurement of the fabricated structure; and
extract the metrology measurement associated with the fabricated structure from the output metrology image based on the metrology recipe.

30. The metrology system of claim 29, wherein the one or more selection metrics comprise:
an accuracy of the extracted metrology measurements on the one or more predicted metrology images.

31. The metrology system of claim 29, wherein the one or more selection metrics comprise:
a robustness of the extracted metrology measurement to noise in the one or more predicted metrology images.

32. The metrology system of claim 29, wherein the three-dimensional model of the sample includes two or more instances of the structure in which one or more attributes of the structure are systematically varied to represent deviations in a fabrication process.

33. The metrology system of claim 32, wherein the one or more selection metrics comprise:
a robustness of the extracted metrology measurement to the deviations in the fabrication process.

34. The metrology system of claim 29, wherein generating the predicted metrology image comprises:
simulating a metrology measurement of the sample by the metrology tool based on the three-dimensional model.

35. The metrology system of claim 29, wherein generating the predicted metrology image comprises:
emulating a metrology measurement of the sample by the metrology tool based on the three-dimensional model.

36. The metrology system of claim 29, wherein generating the predicted metrology image comprises:
generating the predicted metrology image based on deep generative modeling.

37. The metrology system of claim 29, wherein the predicted deviations from the two-dimensional projection of the three-dimensional model comprise:
at least one of stochastic noise associated with the fabrication of the structure or stochastic noise associated with the metrology measurement of the structure with the metrology tool.

38. The metrology system of claim 29, wherein the predicted deviations from the two-dimensional projection of the three-dimensional model comprise:
 shadowing artifacts associated with analysis of the sample with the metrology tool.

39. The metrology system of claim 29, wherein the metrology tool comprises:
 an electron-beam metrology tool, wherein the predicted deviations from the two-dimensional projection of the three-dimensional model comprise:
 charging artifacts associated with analysis of the sample with the electron-beam metrology tool.

40. The metrology system of claim 29, wherein the three-dimensional model of the sample comprises:
 at least one of chemical, mechanical, electrical, or optical properties of one or more patterned material layers.

41. The metrology system of claim 29, wherein generating the three-dimensional model of the structure comprises:
 simulating one or more process steps of fabricating the structure with a selected process tool.

42. A metrology method comprising:
 generating, with one or more processors, a three-dimensional model of a sample including one or more instances of a structure to be analyzed by a metrology tool;
 generating, with one or more processors, one or more predicted metrology images corresponding to a predicted analysis of the sample with the metrology tool based on the three-dimensional model, wherein the predicted metrology image includes predicted deviations from a two-dimensional projection of the three-dimensional model based on the predicted analysis of the sample with the metrology tool;
 evaluating, with one or more processors, two or more candidate metrology recipes for extracting a metrology measurement from the one or more predicted metrology images;
 selecting, with one or more processors based on one or more selection metrics, a metrology recipe from the two or more candidate metrology recipes for extracting a metrology measurement from an image of the structure from the metrology tool;
 performing, with the metrology tool, an output metrology image of a fabricated structure based on a metrology measurement of the fabricated structure; and
 extracting, with one or more processors, the metrology measurement associated with the fabricated structure from the output metrology image based on the metrology recipe.

\* \* \* \* \*